UNITED STATES PATENT OFFICE.

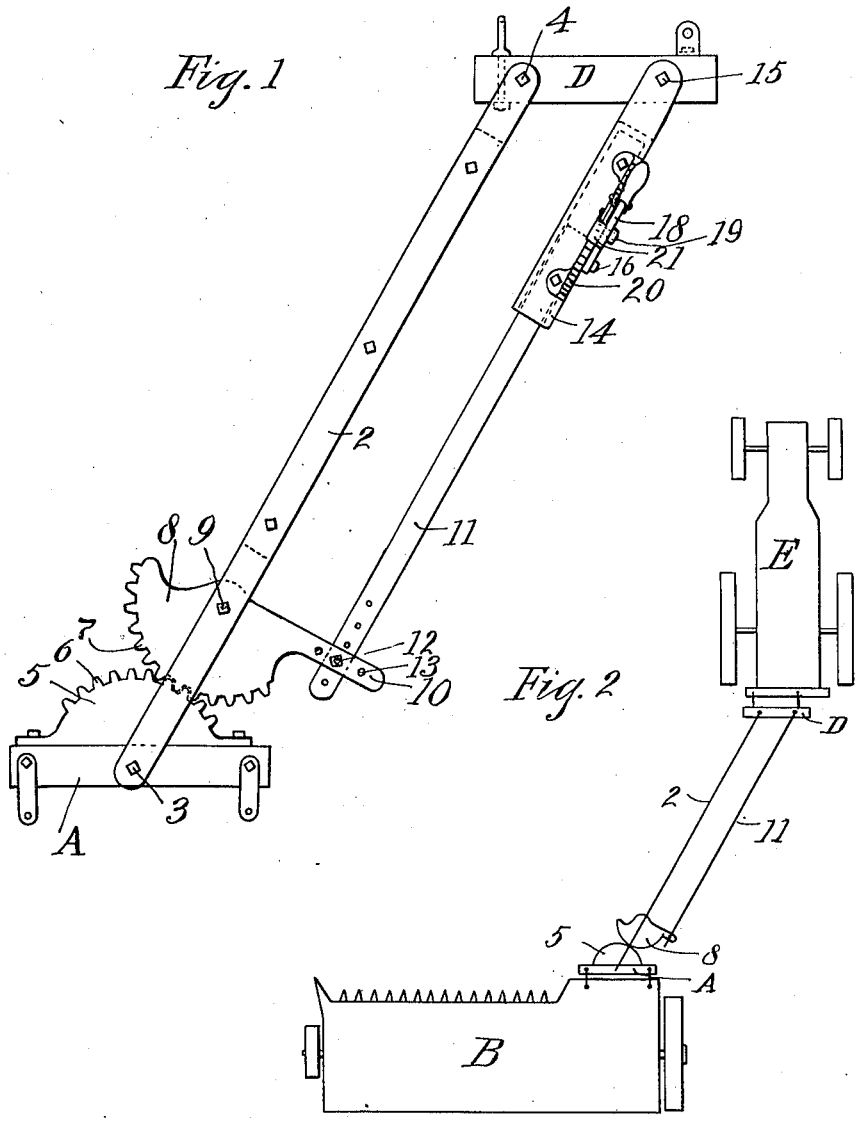

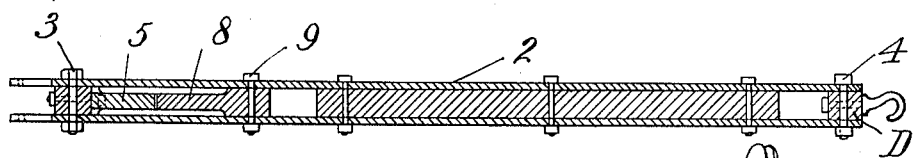
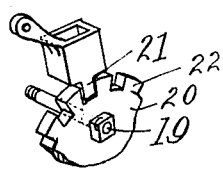
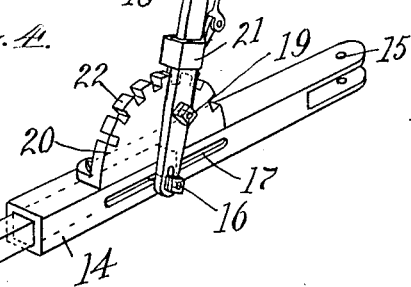
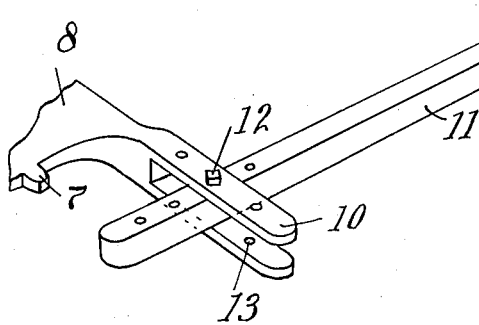
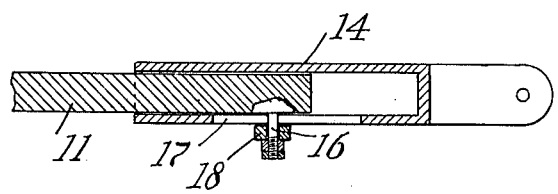

PAUL HANSMANN, OF LONG PRAIRIE, MINNESOTA.

COUPLING MECHANISM.

1,298,699.

Specification of Letters Patent.   Patented Apr. 1, 1919.

Application filed April 30, 1917.   Serial No. 165,573.

*To all whom it may concern:*

Be it known that I, PAUL HANSMANN, a citizen of the United States, residing at Long Prairie, in the county of Todd and State of Minnesota, have invented certain new and useful Improvements in Coupling Mechanism, of which the following is a specification.

My invention relates to improvements in draft connections for coupling one vehicle behind another wherein the path of travel of one vehicle may be controlled from the next forward vehicle, with the vehicles held in relatively off-set positions.

To this end my invention consists in the construction, combination and arrangement of parts hereinafter particularly described and claimed.

In the accompanying drawings forming part of this specification,

Figure 1 is a plan view of my improved invention.

Fig. 2 is a diagrammatic view of the same shown in use between a binder and tractor.

Fig. 3 is a longitudinal section through the member 2 of Fig. 1.

Fig. 4 is a fragmentary perspective view of a portion of my invention.

Fig. 5 is a fragmentary horizontal section through the members 11 and 14 of Fig. 4, and Fig. 6 is a detail of a portion of the mechanism shown in Fig. 4.

Referring to the drawings A represents a crossbar forming part of a vehicle, as a binder B, and D represents a crossbar forming part of the next forward vehicle as the tractor E. Forming a direct connection between the vehicle member A and the vehicle member D is a draft bar 2. The draft bar 2 has pivotal connection 3 with the vehicle member A and similar connection 4 with the vehicle member D.

For the purpose of controlling the relatively off-set positions of the connected vehicles and the path of travel of the rear vehicle and the forward vehicle, I provide the following described parts in coöperation with the draft bar 2. Carried by the vehicle member A is a forwardly projecting toothed segment 5, the teeth 6 of which intermesh with the teeth 7 on the cross member 8, the cross member 8 having pivotal support 9 upon the draft bar. As shown, the cross member 8 is formed with an outwardly projecting arm 10 which has adjustable connection with the rear end of a lever arm 11. Adjustable connection between the arm 10 and the lever arm 11 is preferably secured through the medium of a bolt 12 passing through selected ones of the openings 13 in the arm 10, and adjacent end of the lever arm 11. The forward end of the lever arm 11 telescopes within a hollowed bar 14, the forward end of the bar 14 having pivotal connection 15 with the vehicle member D. The bars 11—14 thus constitute an adjustable extensible connection between the arm 10 of the cross member 8 and the vehicle member D at one side of the draft bar. The bar 11 is adjustably connected with the bar 14 through the medium of a bolt 16 projecting outwardly from the end of bar 11 through a slot 17 in the side of the bar 14, the outer end of the bolt 16 being secured in the lower end of a lever arm 18, which lever arm 18 has fulcrum support 19 upon a toothed segment 20, projecting upwardly from the bar 14. The lever arm 18 is provided with a suitable pawl 21 adapted to intermesh with the teeth 22 of the segment 20. The pawl is adapted to be actuated by a suitable release rod 23 pivotally supported upon the lever arm 18.

By means of the lever arm 18 and the pawl and teeth 21—22 the bar 11 may be moved into or out of the bar 14 thus shortening or lengthening the connection between the arm 10 and the vehicle member D. This shortening or lengthening of the aforesaid connection turns the cross member 8 to adjust the angular position of the draft bar 2 and thereby adjust the relative amount of off-set of the connected vehicles. Thus in operation as the vehicle bar D is turned, the cross member 8 will be turned through the medium of the connection 11—14 and this turning of the cross member 8 will through the intermeshing of the teeth 6 and 7 turn the rear vehicle member A. The path of travel of the rear vehicle part A is thus automatically controlled from the front vehicle D.

My invention is designed for use wherever it is desired to draw one vehicle behind another and to automatically control the path of travel of one from the other. The adjusting lever 18 may if desired be left out and the necessary adjustment secured by the bolt 12.

I claim:

1. In combination with vehicles arranged in series, a draft member connecting said vehicles, said draft member being pivotally connected with each vehicle, means for maintaining said draft member in position holding said vehicles relatively off-set consisting of a cross bar member pivotally supported by said draft member, a lever actuatable adjusting connection between one end of said cross bar member and one vehicle and an operative connection between said cross member and the other vehicle.

2. In combination with vehicles arranged in series, a draft member connecting said vehicles, means for controlling the path of travel of one vehicle from the other consisting of a member pivotally supported upon said draft member, means including a lever actuated extensible arm for turning said pivotally supported member from one vehicle and means for turning the next vehicle from said pivotally supported member.

3. In combination with vehicles arranged in series, a draft member connecting said vehicles, means for maintaining said draft member in position holding said vehicles relatively off-set and controlling the travel from one vehicle to the other consisting of a cross member pivotally supported by said draft member, and a lever actuated adjustable connection between one end of said cross member and the next vehicle and gear tooth connection between said cross member and the other vehicle.

4. In combination with vehicles arranged in series, a draft member connecting the vehicles and being pivoted to each vehicle, means for controlling the travel of one vehicle from the next consisting of a cross member pivotally supported by said draft member, a lever arm connection between said cross member and one vehicle, lever actuated means for adjusting the length of said connection and a gear tooth connection between said cross member and the other vehicle.

In testimony whereof I affix my signature in presence of two witnesess.

PAUL HANSMANN.

Witnesses:
H. S. JOHNSON,
H. D. DANGAU.